Patented Sept. 12, 1950

2,521,898

UNITED STATES PATENT OFFICE 2,521,898

POLYMERS OF ACRYLONITRILE WITH ISOBUTENYL ACETATE

John R. Caldwell, Kingsport, Tenn., assignor to Eastman Kodak Company, Rochester, N. Y., a corporation of New Jersey No Drawing. Application September 17, 1949, Serial No. 116,409

9 Claims. (Cl. 260—85.5)

1

This invention relates to new resinous compositions comprising acrylonitrile and isobutenyl acetate.

It is known that unsaturated, polymerizable vinyl-type compounds, e. g. vinyl esters, such as vinyl acetate, can be interpolymerized to give resinous polymers useful in preparing films, fibers, molded articles, etc. The limitations on such polymers are many, however, and their use has been somewhat restricted.

I have now found that isobutenyl acetate (2-methyl-1-propen-1-ol acetate) which can neither be polymerized alone by the usual methods of polymerization (e. g. solution, emulsion, etc. methods) to give a high molecular weight polymer, nor contains a vinyl group, can be interpolymerized with acrylonitrile to give resinous products which are excellently suited for conversion into fibers, sheets, tapes, films and molded objects. Unlike vinyl acetate, isobutenyl acetate does not form a polymer with methyl acrylate, and hence it was most unexpected to find that isobutenyl acetate would interpolymerize with any acrylic-type compound, such as acrylonitrile. Isobutenyl acetate also fails to interpolymerize with vinyl acetate or styrene.

It is, therefore, an object of my invention to provide polymers of acrylonitrile with isobutenyl acetate and a process for preparing them. A further object is to provide films, fibers, molded objects, and the like from these new polymers, and methods for making these materials. Other objects will become apparent from a consideration of the following description and examples.

In accordance with the process of my invention, I interpolymerize isobutenyl acetate with acrylonitrile. The isobutenyl acetate used in practicing my invention can conveniently be prepared by methods heretofore described in the prior art. One useful method is described in Hull and Agett U. S. Patent 2,422,679, dated June 24, 1947. This method comprises reacting isobutyraldehyde with ketene in the presence of an acid, e. g. sulfuric acid. Still another method comprises reacting isopropenyl acetate with isobutyraldehyde in the presence of an acid catalyst, e. g. acetylsulfoacetic acid, p-toluenesulfonic acid, etc. Such a process is described in the copending applications, Serial No. 25,525, filed May 6, 1948, of H. J. Hagemeyer, Jr., and Serial No. 690,838, filed August 5, 1946, of D. C. Hull and A. H. Agett.

The isobutenyl acetate used in our invention can be represented by the following formula:

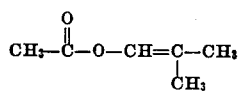

The following procedure is satisfactory for making this compound.

2

*Example A*

98 g. of isobutyraldehyde, 138 g. of isopropenyl acetate and 4 g. of p-toluenesulfonic acid were placed in a flask equipped with a fractionating column. The mixture was slowly heated at such a rate that acetone distilled over at 55°–55.5° C. When no more acetone was evolved, the crude product was distilled, and 90 g. of isobutenyl acetate were obtained. On refractionation, the product was obtained as a distillate boiling at 124°–126° C. ($N_D^{20}$ 1.4197).

The interpolymerization of isobutenyl acetate with acrylonitrile can be accelerated by heat, or by polymerization catalysts which are known to accelerate the polymerization of vinyl-type compounds. Such catalysts include, for example, the organic peroxides (e. g. benzoyl peroxide, acetyl peroxide, acetyl benzoyl peroxide, lauroyl peroxide, etc.), hydrogen peroxide, perborates (e. g. alkali metal perborates, such as those of sodium and potassium) and persulfates (e. g. alkali metal persulfates, such as those of sodium and potassium). The quantity of catalyst used can be varied, depending on the temperature, and presence or absence of solvents, however, I have found that from 0.01% to 2% by weight, based on the total weight of isobutenyl acetate and acrylonitrile, of catalyst is usually sufficient for the purposes of my invention.

The temperatures at which the process of my invention can be carried out can vary from ordinary room temperature to the reflux temperature of the reaction mixture. Generally a temperature of from 25° to 75° C. is sufficient.

Advantageously, the interpolymerization can be effected with or without a diluent. The diluent, if employed, is conveniently a solvent for the copolymers. The monomers can also be emulsified in a liquid in which they are insoluble (e. g. water), with or without the aid of emulsifying agents, and the emulsion subjected to polymerization. Typical emulsifying agents include the alkali metal salts of fatty alcohol sulfates (e. g. sodium lauryl sulfate); alkali metal salts of aromatic sulfonic acids; sulfo-succinic acid esters, their alkali metal salts or amine addition salts; alkali metal salts of fatty acids containing from 12 to 20 carbon atoms; and sulfonated fatty acid amides, or their alkali metal salts. In general, any of the known emulsifying agents can be used. Polymers having excellent solubility properties can be obtained by dissolving the monomers in a 30 to 40% aqueous solution of sodium toluene sulfonate, sodium xylene sulfonate or sodium cumene sulfonate.

The polymerization can also be carried out by the bead or pearl polymerization, in which the monomers are dispersed in a medium in which they are insoluble (e. g. water), and the dispersion polymerized with or without the aid of weak dispersing agents, such as gum arabic, gelatin, methylated starch, polyvinyl alcohol, etc. The polymerization is advantageously effected in a container, filled to about three-fourths capacity, which is tumbled end over end until the polymerization is complete.

Chain regulators, such as hexyl, octyl, lauryl, dodecyl or myristyl mercaptans, etc., which impart improved solubility properties to the copolymers can be used if desired.

Although the ratio of isobutenyl acetate to acrylonitrile in the mixture prior to polymerization can be varied over a relatively wide range, I have found that most useful results are obtained by interpolymerizing a monomeric mixture comprising from 2 to 50 per cent by weight of isobutenyl acetate and from 50 to 98 per cent by weight of acrylonitrile. The polymer products thus obtained contain from 5 to 20 per cent by weight isobutenyl acetate and from 80 to 95 per cent by weight of acrylonitrile in the polymer molecule. That is, the polymer products always tend to be richer in acrylonitrile than the mixture of monomers, with some variation occurring due to differences in modes of polymerization, and reaching an apparent maximum when the polymer contains about 20 per cent of the isobutenyl ester. When less than 10 per cent by weight isobutenyl acetate is employed in the monomeric mixture, the composition of the polymer approaches more closely that of the monomeric mixture. Since the isobutenyl acetate polymerizes at a slower rate than the acrylonitrile the monomers can be added to the reaction medium containing the polymerization catalyst at about the rate they are used up. Generally, the polymer products do not contain more than 20 per cent by weight isobutenyl acetate, even though the reaction mixture contains a large amount of this material as noted above.

The following examples will serve to illustrate more fully the manner whereby I practice my invention.

*Example 1*

30 g. of acrylonitrile, 10 g. of isobutenyl acetate, and 0.4 g. of benzoyl peroxide were intimately mixed and then sealed in a glass tube. When the tube was heated at 60° C. for 24 hours, a hard, opaque resin was obtained. This was granulated and washed with acetone. On analysis it was found to contain 85 per cent by weight acrylonitrile and 15 per cent by weight isobutenyl acetate. It was found to be excellently adapted as a molding plastic.

*Example 2*

0.2 g. of potassium persulfate were dissolved in 100 cc. of water and 0.5 g. of sulfonated mineral oil added. While the mixture was stirred, 20 g. of acrylonitrile and 10 g. of isobutenyl acetate were added. After the addition was complete, the mixture was stirred at 60° C. for 20 hours. The polymer product was precipitated by pouring into a hot 5 per cent solution of sodium sulfate. The mixture was then filtered, and the filter cake was washed, first with acetone and then with several changes of distilled water. The polymer was dried in a hot-air oven. There were obtained 22 g. product, which was found to contain 89 per cent by weight of acrylonitrile and 11 per cent by weight of isobutenyl acetate on analysis.

*Example 3*

0.2 g. of potassium persulfate were dissolved in 100 cc. of water and 0.8 g. of sodium lauryl sulfate added. While the mixture was stirred, 20 g. of acrylonitrile and 6.0 g. of isobutenyl acetate were added. The mixture was then stirred at 70° C. for 18 hours, at the end of which time polymerization appeared to be complete. The polymer product was precipitated by adding a 5 per cent solution of sodium sulfate to the emulsion. The reaction mixture was filtered, and the filter cake was washed first with acetone and then with several changes of distilled water. The polymer product, after drying in a hot-air oven, weighed 18 g. On analysis it was found to contain 92 per cent by weight of acrylonitrile and 8 per cent by weight of isobutenyl acetate.

The resins obtained in the above examples are characterized by their solubility in those solvents which can be used in the preparation of fibers from polyacrylonitrile, e. g. N,N-dimethylformamide, N,N-dimethylacetamide, mixtures of acetonitrile and N,N-dimethylformamide, N,N-dimethyl methoxyacetamide, etc. The following illustrative procedure is generally useful in preparing solutions of the new polymers of my invention, from which strong, durable fibers can be obtained.

10. g. of the polymer obtained in Example 3 were ground to a small-mesh particle size, and then dispersed in a mixture of acetonitrile and N,N-dimethylformamide (2:1 parts by volume). After stirring, the suspended solids dissolved and the solution was placed in a container. The air in the container was displaced with nitrogen, and pressure was applied by the addition of more nitrogen gas under pressure. The viscous solution was extruded through a spinnerette, which was located at one end of the container, into a water bath heated to 25° C. where it coagulated into fine, lustrous filaments. After passing through the 40-inch length of the water bath, the filaments were passed through a hot-air, drafting chamber, where they were stretched, or drafted, 400 per cent by passing over rollers of varying diameters and revolving at different speeds. After applying a slight twist to the filaments to make a single fiber, the fiber was wound on a drum or winder. The fiber showed excellent tensile strength and elastic recovery. It was also characterized by a high melting point (above 180° C.) and a susceptibility to many of the dyes commonly used on cellulose acetate yarn.

Operating in a similar manner, other interpolymers of isobutyenyl acetate and acrylonitrile can be prepared, which are likewise useful in the manufacture of fibers. Molded objects, films, tapes, etc. can also be fabricated from our new polymers. Plasticizers can be incorporated in the polymer before extrusion thereof into films, tapes, etc. Suitable plasticizers include camphor, triacetin, dialkyl phthalates (e. g. di-n-butyl phthalate), triethylene glycol sebacate, etc. The new polymers can also be used in impregnation of textiles, paper sizing, metal coating, preparation of glass interlayers, etc.

What I claim as my invention and desire secured by Letters Patent of the United States is:

1. A resinous interpolymer of isobutenyl acetate and acrylonitrile containing from 5 to 20 per cent by weight of isobutenyl acetate and from 80 to 95 per cent by weight of acrylonitrile in the polymer molecule.

2. A resinous interpolymer of isobutenyl acetate and acrylonitrile containing 15 per cent by weight of isobutenyl acetate and 85 per cent by weight of acrylonitrile in the polymer molecule.

3. A resinous interpolymer of isobutenyl acetate and acrylonitrile containing 11 per cent by weight of isobutenyl acetate and 89 per cent by weight of acrylonitrile in the polymer molecule.

4. A resinous interpolymer of isobutenyl acetate and acrylonitrile containing 8 per cent by weight of isobutenyl acetate and 92 per cent by weight of acrylonitrile in the polymer molecule.

5. A process for preparing a resinous interpolymer comprising heating, in the presence of a peroxide polymerization catalyst, a mixture consisting of from 2 to 50 percent by weight of isobutenyl acetate and from 50 to 98 per cent by weight of acrylonitrile.

6. A process for preparing a resinous interpolymer comprising heating, in the presence of an inorganic peroxide polymerization catalyst, a mixture consisting of from 2 to 50 per cent by weight of isobutenyl acetate and from 50 to 98 per cent by weight of acrylonitrile.

7. A process for preparing a resinous interpolymer comprising heating, in the presence of an inorganic peroxide polymerization catalyst, a mixture consisting of 10 parts by weight of isobutenyl acetate and 30 parts by weight of acrylonitrile.

8. A process for preparing a resinous interpolymer comprising heating, in the presence of an inorganic peroxide polymerization catalyst, a mixture consisting of 10 parts by weight of isobutenyl acetate and 20 parts by weight of acrylonitrile.

9. A process for preparing a resinous interpolymer comprising heating, in the presence of an inorganic peroxide polymerization catalyst, a mixture consisting of 6 parts by weight of isobutenyl acetate and 20 parts by weight of acrylonitrile.

JOHN R. CALDWELL.

No references cited.